3,280,097
CORROSION INHIBITORS
Arthur Cizek, Houston, Tex., assignor to Atlas Chemical Industries, Inc., Wilmington, Del., a corporation of Delaware
No Drawing. Filed May 4, 1964, Ser. No. 364,796
9 Claims. (Cl. 260—102)

This invention relates to compositions useful as corrosion inhibitors. More particularly, this invention relates to improved corrosion inhibiting compositions having application in oil refineries, oil and gas well, water wells, wells in the process of being drilled and, in general, wherever metal is present in a corrosive environment.

The corrosive effect of oil and brine mixtures commonly present in the wells of oil producing formations upon metal tubing, casings, pumps and other oil producing machinery and equipment is well known. One method of reducing the corrosive effect of such oil and brine mixtures in oil wells is known as a corrosion inhibitor "squeeze" treatment wherein a suitable corrosion inhibitor is forced down the well with pressure into the producing formation. During such treatment, the inhibitor adsorbs to the well tubing and, thereafter, the inhibitor in the formation, which has been slowly solubilizied by produced fluids, replenishes the inhibitor removed from metallic surface during production. Preferred "squeeze" inhibitors strongly adsorb to metal, do not readily solubilize in produced fluids and do not cause such fluids to emulsify. Certain commercial corrosion inhibitors, as, for example, many of the fatty amine and imidazoline class, may be used as "squeeze" corrosion inhibitors, but these suffer from the disadvantage that they must be combined with suitable surface active materials in order to obtain the inhibitor characteristics essential to such use.

The corrosion and corrosion eroding of drill pipe during the process of drilling an oil well is another difficulty commonly encountered in the field which may be overcome by the use of suitable corrosion inhibitors. At the present time, little is known about the effectiveness of conventional corrosion inhibitors for this purpose. However, the variable physical and chemical properties of drilling fluids requires that drilling fluid inhibitors be effective under a variety of conditions.

It is, accordingly, an object of this invention to provide corrosion inhibitor compositions having application wherever the corrosion of metal as a result of exposure to carbon dioxide, hydrogen sulfide, short chain organic acids, inorganic acids, brine and other similarly corrosive materials may occur.

It is another object of the present invention to provide corrosion inhibitor compositions which may suitably be used in the "squeeze" corrosion inhibitor treatment of gas and oil producing formations.

It is another object of this invention to provide corrosion inhibitor compositions suitable for use as drilling fluid inhibitors in the process of drilling oil and gas wells.

It is another object of this invention to provide corrosion inhibitors having demulsification characteristics which promote the resolution of emulsified corrosive well fluids.

The foregoing objects and still further objects and advantages of the invention which will become apparent hereinafter, are achieved by providing corrosion inhibitor compositions which comprise the condensation products of an alkyl or cycloalkyl phenol with an aldehyde and a polyamine and certain derivatives and chemical combinations thereof. Broadly, basic corrosion inhibiting compounds which, together with suitable derivatives and chemical combinations thereof, are useful in the provision of corrosion inhibitor compositions in accordance with the present invention, are characterized by the following generalized formula:

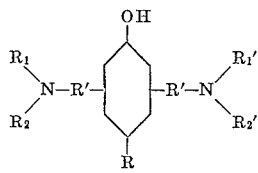

wherein R is an alkyl or cycloalkyl radical having from 4 to 12 carbon atoms, wherein R' is a divalent alkylene radical, wherein $R_1$ and $R_1'$ are each selected from the group consisting of hydrogen and an acyclic hydrocarbon radical having from 1 to 18 carbon atoms, and wherein $R_2$ and $R_2'$ are each heteroacyclic hydrocarbon radicals containing from 1 to 3 primary or secondary amine groups, either or both, each of said groups being separated from another by from 2 to 6 carbon atoms.

Compounds of the foregoing type may be prepared by condensation of a polyamine having primary or secondary amino groups with an alkyl phenol and an aldehyde to form a molecule having two or more amine groups of primary or secondary type.

The phenolic compound may be selected from a wide variety of alkyl or cycloalkyl phenols and may include for example, para-t-butyl, para-t-amyl, para-t-nonyl, cyclohexyl phenol, octyl phenol, decyl phenol, and dodecyl phenol. Likewise, the aldehyde may similarly be selected from a numerous group aldehyde such as, formaldehyde, acetaldehyde, propionaldehyde, butyraldehyde and the like; R' in the above formula, for example, may be a methylene radical of paraformaldehyde.

Representative polyamines which may be used in the preparation of the condensation products characterized by the foregoing formula include alkylene polyamines such as diethylenetriamine, N-tallow propylenediamine (Armour Duomeen T) or a condensation of diethylenetriamine. Other suitable polyamines are dipropylenetriamine, ethylenediamine, 9 amino-10 hydroxy-stearyl amine and, in general, polyamines containing 2 or more amine groups of either primary or secondary nature, or both.

Among the derivatives of the condensation products of alkyl or cycloalkyl phenols, aldehydes and polyamines which are useful in the preparation of corrosion inhibitor compositions in accordance with the present invention are classes of alkylene oxide adducts of the aforesaid condensation products which include (a) preparations with a number of moles of alkylene oxide sufficient to convert completely all the primary and secondary amino groups of the condensation product to tertiary amine and (b) preparations with a number of moles of alkylene oxide which are sufficient to convert only a part of all the available primary and secondary amino groups of the polyamine condensation product to tertiary amine. Representative of alkylene oxides which may be used in the alkoxylation of the polyamine condensation product are ethylene oxide and propylene oxide. Adducts of butylene oxide and mixtures of alkylene oxides may also be used.

Another class of derivatives useful in the formulation of corrosion inhibitor compositions in accordance with the present invention are organic acid esters of the above-described alkylene oxide adducts of polyamine condensation products. Typical of the acids which may be used to form esters of the aforementioned alkylene oxide adducts is tall oil acid. Esters prepared by using other organic acids including water-soluble, oil-soluble, saturated, unsaturated, cyclic, acyclic, monobasic and polybasic acids may be used. In general, in accordance with the present invention, the mole ratio of organic acid to alkylene oxide adduct of polyamine condensation product is such that one carboxyl group of the acid is reacted in the presence of from 10 to 1 hydroxyl groups in the adduct.

Organic acid salts of the condensation products of alkyl or cycloalkyl phenols, aldehydes and polyamines of the present invention, their alkylene oxide adducts and the organic acid esters of said adducts also constitute a class of derivatives useful in the formulation of corrosion inhibitor compositions in accordance with this invention. A variety of organic acids may be used to form suitable salts with the aforementioned polyamine condensation products and their derivatives. Illustrative of such organic acid salts, for example, are various dimer acid salts, castor-phthalate salts, and tall oil salts.

Throughout this specification, the term "castor-phthalate salt" refers to a salt formed by a chemical combination of one of the previously described polyamine condensation products or a derivative thereof with the reaction product of about 75% castor and about 25% phthalic anhydride prepared by first preheating the castor oil to about 100° F. and thereafter heating to a temperature within a range of about 250°–260° F., after which the phthalic anhydride is added thereto. The reaction mixture is then heated to a temperature of about 410° F. for one hour, allowed to cool to 360° F. and maintained at that temperature for a period of about 6 hours. The mixture is agitated throughout the reaction during which very little or no distillate comes over. At the end of about 6 hours the resinous reaction product is cooled to approximately 250° F. and discharged. For convenience, throughout this specification, the aforedescribed reaction product may be referred to as "castor-phthalate resin."

The dimeric derivatives of fatty acids suitable for use in the preparation of corrosion inhibitor compositions in accordance with the present invention are the condensation products or dimers of two molecules of fatty acid. Mixtures of the dimers with monomeric acids or mixtures of dimeric acids are also suitable. Dimers of suitable fatty acids are obtained, for example, as a by-product of sebacic acid. Dimeric acids suitable for use in the practice of the present invention may be prepared by any of the methods described in the U.S. patent to Goebel, 2,482,761 or the U.S. patent to Landis, 2,632,695. Suitable polymer acids for the purpose of the present invention are polymerized di-unsaturated mono-carboxy acids, e.g., dilinoleic acid and the dimeric acids obtained by the dry distillation of castor oil in the presence of sodium hydroxide. Suitable dimer acids are a commercial form of a dimeric polymer consisting essentially of dilinoleic acid. The method used in their preparation is set forth in the Journal of the American Oil Chemists Society, 24, 65 (March 1947). Specifications are as follows:

Neutral equivalent _____ 290–310.
Iodine value _____ 80–95.
Color _____ Gardner 12 max.
Dimer content _____ Approx. 85%.
Trimer and higher _____ Approx. 12%.
Monomer_____ Approx. 3%.

The polyamine condensation products of the present invention may be prepared by means of a reaction, the mechanics of which are believed to involve, although not neccessarily completely, those of the well-known "Mannich" reaction whereby primary or secondary polyamines, or both, condensed to alkyl or cycloalkyl phenols with an aldehyde, form a molecule having two or more amine groups of primary or secondary type. The polyamine condensation is effected by blending the polyamine and alkyl or cycloalkyl phenol to a uniform dispersion, or solution, depending upon the solubility of the reactants. If necessary, the mixture is heated to liquefy the reactants. The aldehyde is then added at room temperature to the reactants after the amine has been wetted by the phenolic compound. Heat but no catalyst is required to obtain condensation. The reaction is carried out at room temperature which, however, may rise to as high as 215° C. at the termination of the reaction. Condensation is considered complete when one mole of water is driven off for each mole of reactant aldehyde.

The following are specific examples of the preparation of condensation products of polyamines, aldehydes and alkyl or cycloalkyl phenols useful in the practice of the present invention:

Example 1

To a suitable coverable vessel equipped with an agitator and a condenser cooling system such as a reaction kettle with cover and vent, are added at room temperature 45.26 grams nonyl phenol followed by 12.33 grams of paraformaldehyde, after which the reactants are mixed to a uniform suspension. The agitator is then shut off and 42.41 grams diethylenetriamine is added to the vessel without further mixing. The vessel is closed, the vent opened and agitator turned on. Prior to adding the amine, the condenser cooling water is turned on. Exothermic reaction of the mixture in the vessel will carry the temperature to about 100° C., after which heat is slowly applied to the vessel. Continue applying heat to the vessel in such manner that the desired temperature of 215° C. is reached after about 2 to 3 hours from the start of the exothermic reaction. Reaction is complete when 215° C. is reached. From 7.7% to 8.0% distillate (aqueous) based on the starting weight of the reactant materials will come over during the reaction. When the reaction has been completed, the reaction product is cooled below 120° C. and is then ready for use.

Examples 2 to 6 in the following Table I illustrate the preparation of further polyamine condensation products according to the method set forth in Example 1 wherein the reactant materials and the proportions thereof have been varied as indicated:

TABLE I.—POLYAMINE CONDENSATION PRODUCTS

| Example No. | Polyamine | | Aldehyde | | Alkyl Phenol | | Aqueous Distillate, ml. | | Amine Analysis, percent | | |
|---|---|---|---|---|---|---|---|---|---|---|---|
| | Name | Wt., gms. | Name | Wt., gms. | Name | Wt., gms. | Theoretical | Actual | Primary | Secondary | Tertiary |
| 2 | Diethylene triamine. | 824 | Paraformaldehyde. | 240 | Nonyl | 880 | 144 | 155 | 23 | 77 | 0 |
| 3 | ----do------ | 927 | ----do------ | 270 | p-t-Amyl | 738 | 162 | 187 | | | |
| 4 | ----do------ | 1030 | ----do------ | 300 | p-t-Butyl | 750 | 180 | 193 | | | |
| 5 | ----do------ | 109 | ----do------ | 60 | Nonyl | 220 | 36 | | 12 | 88 | 0 |
| 6 | N-tallow propylene diamine. | 740 | ----do------ | 60 | ----do------ | 220 | 36 | | 15 | 56 | 29 |

In general, in the preparation of the types of alkylene oxide adducts of the condensation products of alkyl or cycloalkyl phenols, aldehydes and polyamines hereinbefore specified, from as little as one to as high as about three hundred moles of alkylene oxide may be added to the polyamine condensation product, in acordance with the present invention, by replacement of one or more of the active hydrogen atoms thereof. The alkylene oxide adducts of the polyamine condensation products are preferably prepared in an autoclave using a suitable catalyst such as sodium hydroxide or sodium methylate. Before addition of the alkylene oxide, the autoclave is purged free of oxygen contamination with nitrogen or natural gas and is then heated to a temperature within the range of about 100° C. to 150° C. Addition of the alkylene oxide to the polyamine condensation product is started at about 30 p.s.i.g. inert gas pressure in the autoclave and at a temperature within a range of about 100° C. to 160° C. Generally, 30 to 100 p.s.i.g. pressure is reported during alkylene oxide addition and the addition requires from about one to about ten hours reaction time.

The following are specific examples of the preparation of alkylene oxide addition products of the polyamine condensation products of the present invention:

ylene oxide at the 10% flow rate is continued until a steady temperature and pressure have been attained. It should be noted that at this stage of the reaction, a temperature of about 300° F. and/or a pressure of about 60 p.s.i.g. should not be exceeded. After the temperature and pressure of the reaction have been brought under control, the flow rate of the ethylene oxide is increased to about 20% and thereafter gradually increased again to about 50%, providing temperature and pressure are controllable during such increase.

Examples 8 to 22 in the following Table II illustrate the further preparation of alkylene oxide adducts of polyamine condensation products according to the method set forth in Example 7, wherein the reactant materials and the proportions thereof have been varied as indicated.

TABLE II.—ALKYLENE OXIDE ADDUCTS OF POLYAMINE CONDENSATION PRODUCTS

| Example No. | Condensation product of— | Weight | Alkylene Oxide | | Analysis | | | Moles Oxide/Moles Resin | |
|---|---|---|---|---|---|---|---|---|---|
| | | | Ethylene Oxide | Propylene Oxide | Acid No. | Amine Eq. | OH Value | Ethylene Oxide | Propylene Oxide |
| 8 | Example 2 | 3,003 | 736 | | | 149 | 749 | 3 | |
| 9 | Example 8 | 2,735 | 533 | | | 184 | 693 | 6 | |
| 10 | Example 9 | 2,268 | 370 | | | 199 | 595 | 9 | |
| 11 | Example 10 | 1,638 | 228 | | | 201 | 524 | 12 | |
| 12 | Example 8 | 3,276 | | 2,088 | −.24 | 190 | 634 | | 6 |
| 13 | Example 12 | 3,576 | | 696 | −.95 | 232 | 533 | | 9 |
| 14 | Example 13 | 2,136 | | 348 | −.65 | 279 | 454 | | 12 |
| 15 | Example 8 | 2,295 | 3,705 | | −1.1 | 234 | 445 | 20 | |
| 16 | Example 15 | 4,000 | 1,234 | | −1.5 | 370 | 344 | 30 | |
| 17 | Example 16 | 3,234 | 761 | | −1.0 | 463 | 279 | 40 | |
| 18 | Example 17 | 1,995 | 380 | | −0.9 | 547 | 249 | 50 | |
| 19 | Example 8 | 1,921 | | 4,079 | −2.5 | 368 | 344 | | 20 |
| 20 | Example 19 | 4,000 | | 1,361 | −1.9 | 500 | 258 | | 30 |
| 21 | Example 20 | 3,361 | | 854 | −1.8 | 650 | 210 | | 40 |
| 22 | Example 21 | 2,215 | | 448 | −1.3 | 766 | 180 | | 50 |

Esters of alkylene oxide adducts of condensation products of an alkyl or cycloalkyl phenol, aldehyde and polyamine suitable for use in the practice of the present invention may be prepared in the conventional manner by reacting the aliphatic hydroxyl groups of the alkylene oxide chain of the adduct with the carboxyl group of a suitable organic acid of the kind hereinbefore detailed. In the following Table III, Examples 23 to 29 are illustrative of the preparation of representative esters which may be used in accordance with the present invention.

TABLE III.—ESTERS OF ALKYLENE OXIDE ADDUCTS OF POLYAMINE CONDENSATION PRODUCTS

| Example No. | Alkylene Oxide Adduct | Wt. (gms.) | Tall oil, wt. (gms.) | OH/COOM Ratio | Analysis | | |
|---|---|---|---|---|---|---|---|
| | | | | | Acid No. | Saponification No. | OH Value |
| 23 | Example 13 | 208 | 125 | 4.5 | 7.3 | 53 | 256 |
| 24 | Example 14 | 219 | 114 | 4.5 | | | |
| 25 | Example 13 | 237 | 96 | 6.0 | 5.7 | 40 | 314 |
| 26 | Example 15 | 471 | 729 | 1.5 | 10.2 | 115 | 63 |
| 27 | Example 16 | 548 | 652 | 1.5 | 12 | 101 | 69 |
| 28 | Example 17 | 610 | 590 | 1.5 | 12.5 | 90 | 73 |
| 29 | Example 18 | 653 | 547 | 1.5 | 15.7 | 83 | 73 |

*Example 7*

1.27 (50.8%) pounds of the polyamine condensation product of Example 1 and 3.0 grams of sodium hydroxide catalyst are charged to an autoclave using standard methods therefor and then moisture is bled from the reactor at a temperature of about 230° F. Ethylene oxide in an amount of 1.23 pounds (49.2%) is added to the reactor at a temperature within the range of about 230° F. to 240° F. and at a 10% ethylene oxide rate of flow. The reaction is hot and precaution must be taken to prevent excessive temperature and pressure. Feeding of the eth- Acid salts of the polyamine condensation products and derivatives thereof, as provided in accordance with the present invention, may be prepared in the conventional manner by agitating and circulating the reactant materials at a moderately elevated temperature for a period of time sufficient to permit the reaction to go to completion. Frequently it is desirable to allow the aforesaid reaction to take place in an inert solvent which also is used as a diluent for the inhibitor composition. An especially suitable solvent for this purpose is a heavy aromatic naphtha characterized by the specifications appearing in Table IV below:

TABLE IV.—AROMATIC HYDROCARBONS-MEDIUM BOILING RANGE

Boiling range, ° F.:
  Initial _____ 367
  50% _____ 378
  Dry point.
  End point _____ 418
Color saybolt _____ 30
Flash point ° F. tag closed cup _____ 150
Specific gravity at 60/60 ° F. _____ 0.893
Weight per gallon, pounds _____ 7.44
Mixed aniline point ° F. _____ 69.4
Kauri butanol value _____ 90
Aromatics _____percent__ 93

The following examples illustrate the preparation of organic acid salts suitable to the purpose of the present invention:

*Example 30*

To a blending tank equipped with agitator are charged 9.477 pounds of heavy aromatic naphtha as solvent. The agitator is turned on and 1.166 pounds of the 12 dendro polyamine derivative of Example 11 and 1.485 pounds of dimer acid are added. The reaction mixture is heated to 150° F.–160° F. After circulating and agitating the reaction mixture for 2 hours within the aforesaid temperature range, the resulting product is cooled and discharged.

Examples 31 to 34 in the following Table V further illustrate the preparation of acid salts of polyamine condensation products and derivatives thereof according to the method of Example 30 wherein the reactant materials and the proportions thereof have been varied as indicated:

*Example 36*

|                                                  | Wgt. (gms.) |
|--------------------------------------------------|-------------|
| Polyamine derivative of Example 11               | 9.7         |
| Castor phthalate resin                           | 22.3        |
| Tall oil ester of polyoxyethylene (40) sorbitol  | 8.0         |
| Aromatic hydrocarbon                             | 60.0        |

*Example 37*

|                                                  | Wgt. (gms.) |
|--------------------------------------------------|-------------|
| Polyamine derivative of Example 11               | 7.3         |
| Castor phthalate resin                           | 16.7        |
| Tall oil ester of polyoxyethylene (40) sorbitol  | 6.0         |
| Aromatic hydrocarbon                             | 60.0        |

*Example 38*

|                                                  | Wgt. (gms.) |
|--------------------------------------------------|-------------|
| Polyamine derivative of Example 11               | 9.7         |
| Castor phthalate resin                           | 22.3        |
| Tall oil ester of polyoxyethylene (40) sorbitol  | 8.0         |
| Aromatic hydrocarbon                             | 60.0        |

*Example 39*

|                                          | Wgt. (gms.) |
|------------------------------------------|-------------|
| Polyamine derivative of Example 11       | 9.7         |
| Polyamine derivative of Example 26       | 8.0         |
| Castor phthalate resin                   | 22.3        |
| Aromatic hydrocarbon                     | 60.0        |

*Example 40*

|                                          | Wgt. (gms.) |
|------------------------------------------|-------------|
| Polyamine derivative of Example 11       | 9.7         |
| Polyamine derivative of Example 28       | 8.0         |
| Castor phthalate resin                   | 22.3        |
| Aromatic hydrocarbon                     | 60.0        |

*Example 41*

|                                          | Wgt. (gms.) |
|------------------------------------------|-------------|
| Polyamine derivative of Example 26       | 40.0        |
| Aromatic hydrocarbon                     | 60.0        |

TABLE V

| Example No. | Polyamine Derivative | | Acid | | Solvent | |
|---|---|---|---|---|---|---|
| | Identity | Wgt. (gms.) | Identity | Wgt. (gms.) | Identity | Wgt. (gms.) |
| 31 | Polyoxyethylene (12) polyamine of Example 11. | 9.7 | Castor phthalate resin | 22.3 | Aromatic naphtha | 60 |
| 32 | ____do____ | 6.98 | ____do____ | 16.08 | ____do____ | 71.19 |
| 33 | ____do____ | 8.8 | Dimer acid | 11.0 | ____do____ | 70.2 |
| 34 | ____do____ | 5.15 | Castor phthalate resin | 11.85 | ____do____ | 73.0 |

In the formulation of corrosion inhibitor compositions in accordance with the present invention suitable surface active agents which do not detract from the inhibitor characteristics of the aforedescribed polyamine condensation products and their derivatives, may be included therein in certain cases in order to improve the compatibility of the inhibitor in brine or to improve the inhibitor's oil wetting characteristics.

The following example is illustrative of the preparation of a representative corrosion inhibitor composition in accordance with the present invention:

*Example 35*

1.350 pounds (10.0%) of isopropyl amine dodecyl benzene sulfonate and 9.477 pounds (70.2%) of a heavy aromatic naphtha are charged to a blending tank equipped with an agitator. The heat is turned on and the charged materials are agitated and circulated. Thereafter, 1.485 pounds (11.0%) of dimer acid and 1.166 pounds of the 12 dendro polyamine derivative of Example 11 are added. The reaction mixture is heated to 150–160° F. and circulated and agitated for 2 hours at that temperature. Upon completion of the reaction the resulting product is cooled and discharged.

The following are further examples of inhibitor compositions formulated in accordance with this invention:

*Example 42*

|                                          | Wgt. (gms.) |
|------------------------------------------|-------------|
| Polyamine derivative of Example 28       | 40.0        |
| Aromatic hydrocarbon                     | 60.0        |

*Example 43*

|                                                  | Wgt. (gms.) |
|--------------------------------------------------|-------------|
| Polyamine derivative of Example 11               | 6.98        |
| Castor phthalate resin                           | 16.08       |
| Tall oil ester of polyoxyethylene (40) sorbitol  | 5.75        |
| Aromatic hydrocarbon                             | 71.19       |

*Example 44*

|                                                  | Wgt. (gms.) |
|--------------------------------------------------|-------------|
| Polyamine derivative of Example 11               | 9.73        |
| Dimer acid                                       | 13.27       |
| Tall oil ester of polyoxyethylene (40) sorbitol  | 12.0        |
| Aromatic hydrocarbon                             | 58.0        |

*Example 45*

|                                                  | Wgt. (gms.) |
|--------------------------------------------------|-------------|
| Polyamine derivative of Example 11               | 8.8         |
| Dimer acid                                       | 11.0        |
| Tall oil ester of polyoxyethylene (40) sorbitol  | 10.0        |
| Aromatic hydrocarbon                             | 70.2        |

Example 46

| | Wgt. (gms.) |
|---|---|
| Polyamine derivative of Example 12 | 5.15 |
| Castor phthalate resin | 11.85 |
| Tall oil ester of polyoxyethylene (40) sorbitol | 10.0 |
| Aromatic hydrocarbon | 73.0 |

Example 47

| | Wgt. (gms.) |
|---|---|
| Polyamine derivative of Example 2 | 26.4 |
| Paraformaldehyde | 2.9 |
| Diglycolic acid | 3.4 |
| Aromatic hydrocarbon | 67.3 |

Example 48

| | Wgt. (gms.) |
|---|---|
| Polyamine derivative of Example 11 | 23.4 |
| Diglycolic acid | 6.6 |
| Aromatic hydrocarbon | 70.0 |

The quantity of the active effective corrosion inhibitor of the present invention required to retard or prevent corrosion is very small, being of the order of a molecular film on the metallic surface to be protected. In general, a ratio of 10 parts to 200 parts per million of the inhibitor composition based upon total production is adequate to bring corrosive attack under control in the down-hole treatment of oil wells. The inhibitor is preferably distributed on the metal surfaces of the well with the use of an inert solvent as exemplified in the foregoing Examples 35–48. In practice, the inhibitor compositions may be further diluted with fresh or brackish water or with production fluids at the time of application to the well. The inhibitor compositions may be applied by any method suitable for bringing the inhibitor into contact with the metal surfaces of the well, as for example, by batch injection or by continuous injection. The choice of method of application will depend upon the characteristics of the well and the operating economies of the field. In a typical application of the inhibitor composition of Example 35 by the batch method, for example, the composition is diluted with fresh water in the ratio of 1 part inhibitor composition to 4 or more parts of diluent. Treatment of the well is effected with about one and one-half quarts of the inhibitor composition per 100 lb. of produced fluid (inhibitor concentration of approximately 100 p.p.m.) for the first week. Thereafter, the treatment is reduced to a range of about ¼ to 1 quart of inhibitor composition per 100 bbl. of produced fluid (inhibitor concentration of 15 to 60 p.p.m.).

In the "squeeze" type of treatment of well formations, an inhibitor composition and diluent mixture are pumped into the well formation under the proper concentrations and conditions to achieve maximum adsorption. Application of inhibitor in this manner lays down a tough and tenacious film on the surfaces to be protected. Filming is achieved when the inhibitor is pumped down the tubing. It is maintained and repaired as the inhibitor is produced back from the formation. The inhibitor adsorbed on the formation is slowly desorbed back into the well fluid. Such inhibitor desorption tends to increase the effective life of the treatment. The amount of inhibitor composition used in the "squeeze" treatment of a well usually varies from about 50 gallons to about 250 gallons; the amount of diluent varies from about 5 to 20 parts of diluent for each part of inhibitor composition. An overflush of enough fluid to displace the inhibitor from tubing is normally used. Usually, produced oil may be used for the diluent and overflush.

For control of drill pipe and casing corrosion during the drilling process, from one pint to one gallon of the inhibitor composition dispersed in one drum of fresh water may be used. The mixture is injected into the mud system as a slug on an intermittent basis. In severely corrosive systems, inhibitor solution injections may be required on a hourly basis. In mildly corrosive systems, the interval between injections may be four or more hours, depending upon the type and nature of the corrodents.

It will be understood that the compositions of the present invention as described herein and defined in the claims which follow include those compositions containing the named ingredients in the proportions stated and any other ingredients which do not destroy the effectiveness of the compositions for the purpose stated in the specification and, although this invention has been described wtih reference to specific reactant materials, including specific polyamine compounds, phenolic compounds, aldehydes, esters and acids, it will be apparent that still other different and equivalent materials may be substituted for those described, all within the spirit and the scope of this invention as defined in the appended claims.

Having thus described my invention, I claim:

1. A composition of matter which is the reaction product of (1) from about one to about 300 moles of an alkylene oxide and (2) a mole of a polyamine condensation product characterized by the generalized formula

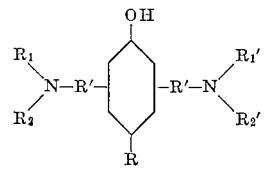

wherein R is an organic radical selected from the group consisting of alkyl and cycloalkyl radicals having from 4 to 12 carbon atoms, wherein R' is an alkylene radical, wherein $R_1$ and $R_1'$ are each selected from the group consisting of hydrogen and an acyclic hydrocarbon radical having from 1 to 18 carbon atoms and wherein $R_2$ and $R_2'$ are each organic alkylene polyamine radicals containing from 1 to 3 amine groups selected from the group consisting of primary and secondary amine groups, each of said amine groups being separated from any other amine group in said composition by from 2 to 6 carbon atoms.

2. A composition of matter which is the reaction product of (1) an organic carboxylic acid and (2) the polyoxyalkylene composition defined in claim 1.

3. A composition according to claim 1 wherein said polyamine condensation product is the reaction product of (1) nonyl phenol, (2) formaldehyde and (3) diethylenetriamine.

4. A composition according to claim 3 wherein said reaction product of said alkylene oxide and said polyamine condensation product includes about 12 moles of ethylene oxide per molecule thereof.

5. A composition of matter which is the reaction product of (1) an organic carboxylic acid and (2) the polyoxyethylene composition defined in claim 4.

6. A composition of matter which is the reaction product of (1) tall oil acid and (2) the polyoxyethylene composition defined in claim 4.

7. A composition of matter which is the reaction product of (1) castor phthalate resin and (2) the polyoxyethylene composition defined in claim 4.

8. A composition of matter which is the reaction product of (1) a dimer acid and (2) the polyoxyethylene composition defined in claim 4.

9. A composition of matter which is the reaction product of (1) diglycolic acid and (2) the polyoxyethylene composition defined in claim 4.

No references cited.

LEON J. BERCOVITZ, *Primary Examiner.*

F. McKELVEY, *Assistant Examiner.*